March 13, 1956

G. R. DUNCAN 2,737,923

VACUUM AND PULSATOR EQUIPMENT FOR USE
WITH THE MILKING OF FARM ANIMALS

Filed Feb. 13, 1951

INVENTOR.
George R. Duncan
BY
Mason & Mason
ATTORNEYS

March 13, 1956
G. R. DUNCAN
2,737,923
VACUUM AND PULSATOR EQUIPMENT FOR USE
WITH THE MILKING OF FARM ANIMALS
Filed Feb. 13, 1951
3 Sheets-Sheet 2
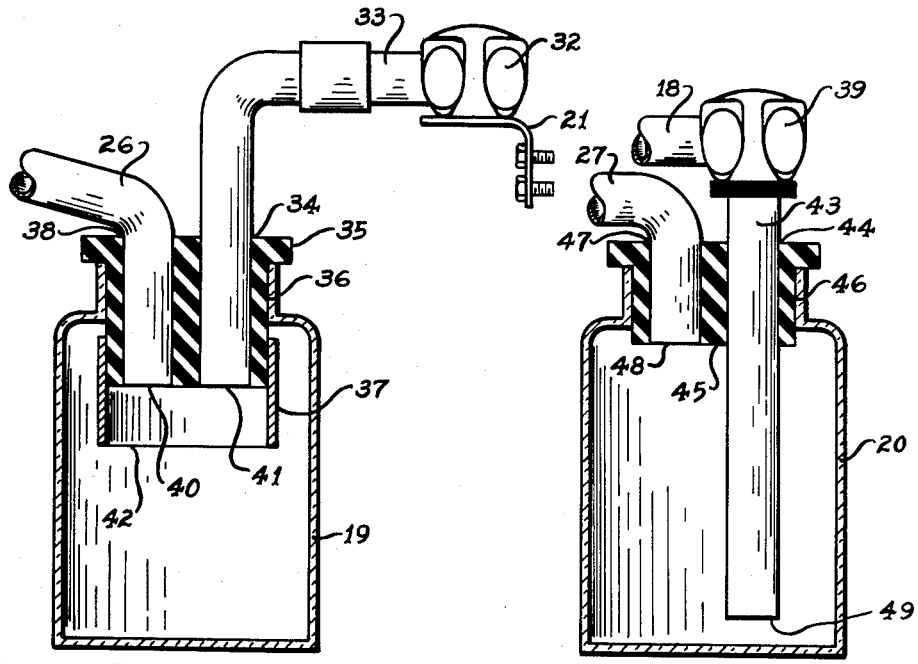
Fig. 3
Fig. 4
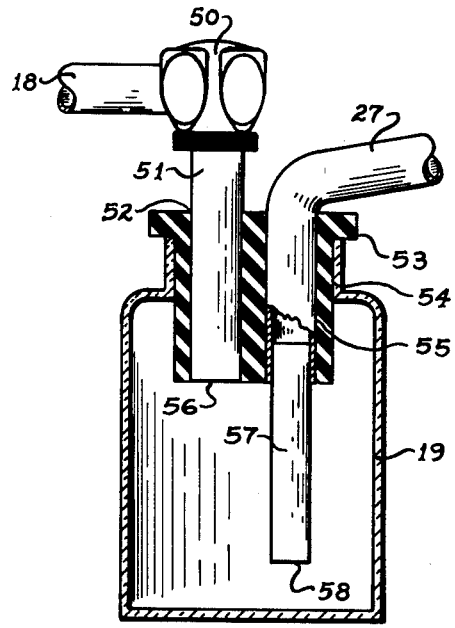
Fig. 5
INVENTOR.
George R. Duncan
BY
Mason & Mason
ATTORNEYS

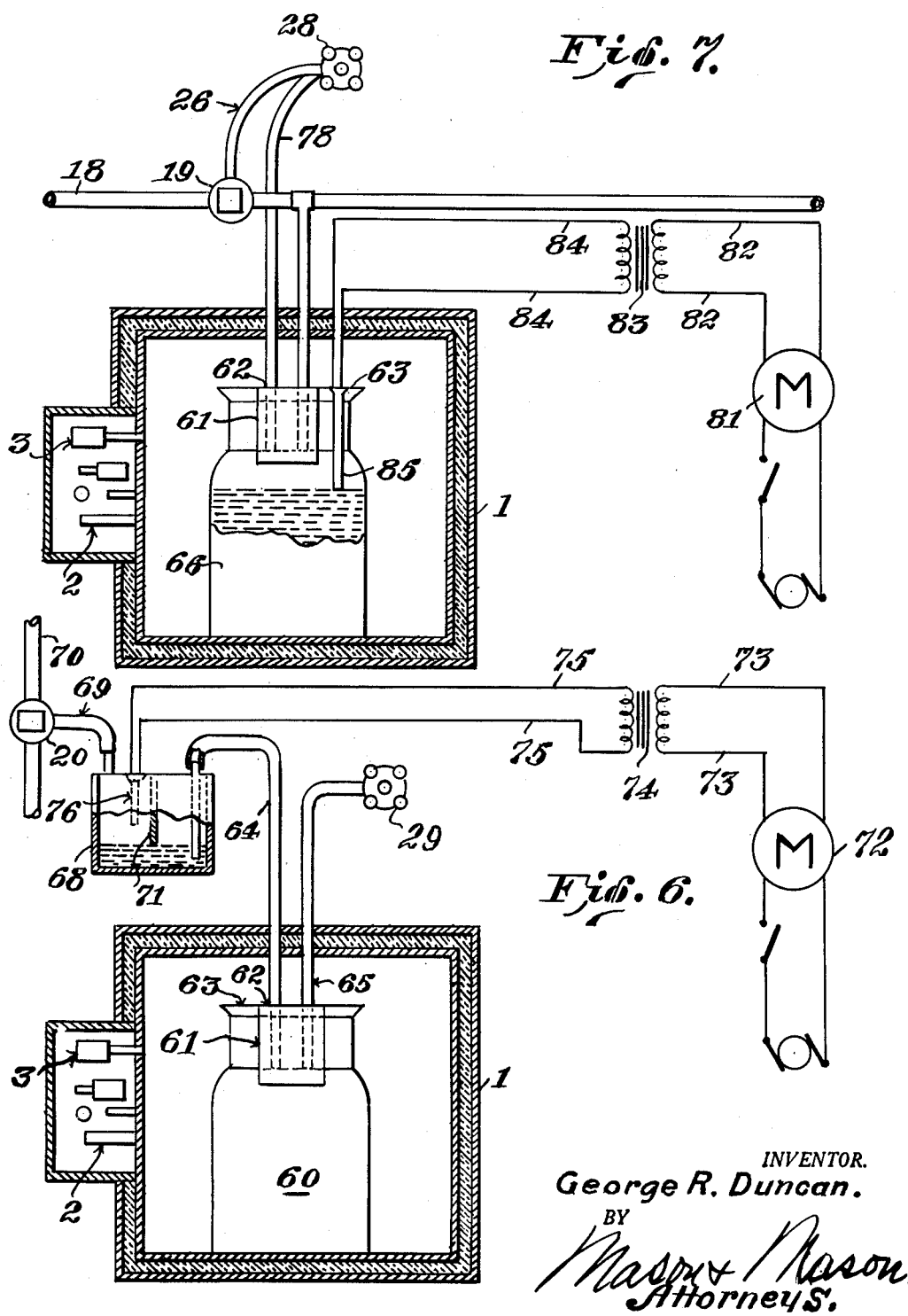

United States Patent Office 2,737,923
Patented Mar. 13, 1956

2,737,923

VACUUM AND PULSATOR EQUIPMENT FOR USE WITH THE MILKING OF FARM ANIMALS

George R. Duncan, Washington, Mo., assignor to Zero Manufacturing Company, Washington, Mo., a company of Missouri Application February 13, 1951, Serial No. 210,749

6 Claims. (Cl. 119—14.09)

This invention relates to vacuum, pulsator and trap mechanism for use with the milking of farm animals. This mechanism has particular application to the inventions described and claimed in my Patents Nos. 2,498,401 and 2,512,094, although the present invention may be employed in any milking equipment which includes a milking machine with means for milking directly into cans, or container means, located in a refrigerator, or cooler. In such constructions the cans, or container means, are continuously cooled by controlled cooling means as the cans are filled with milk, and during the milking operation.

An object of the invention, therefore, is to provide a milking system with vacuum producing means, and including one, or preferably several, traps in the vacuum line.

An additional object is to provide in a system, which includes vacuum line, teat cups and milk cans connected to each other, one or more traps, at least some of which are connected to one or more pulsators.

A further object of the invention is to provide a milking system which includes a vacuum line with one or more branch lines therefrom, each leading to a set of teat cups, and located in each of said branch lines is a pulsator and a trap.

Yet another object is to provide in the system set forth in the next object above, an additional trap connected to, or in the joint between vacuum line and an additional line which is connected to the interior of one of the milk cans. Cans forming a part of a similar system are shown in my Patent No. 2,512,094, granted June 20, 1950.

An additional object is to provide in such a system a trap of especial construction.

Further objects will appear hereinafter through the specification.

Figure 3 is an enlarged vertical sectional view of one form of trap, and showing the connections to the pulsator and vacuum line;

Figure 4 is a view similar to Figure 3 showing a second form of trap and pipe line arrangement;

Figure 5 is a view similar to Figures 3 and 4 of a third form of trap and pipe line arrangement.

Figure 6 is a diagrammatic view of a lay-out from the vacuum line to a milk container; and, Figure 7 is another diagrammatic view showing a different form of the invention from that shown in Figure 6.

Figure 1:
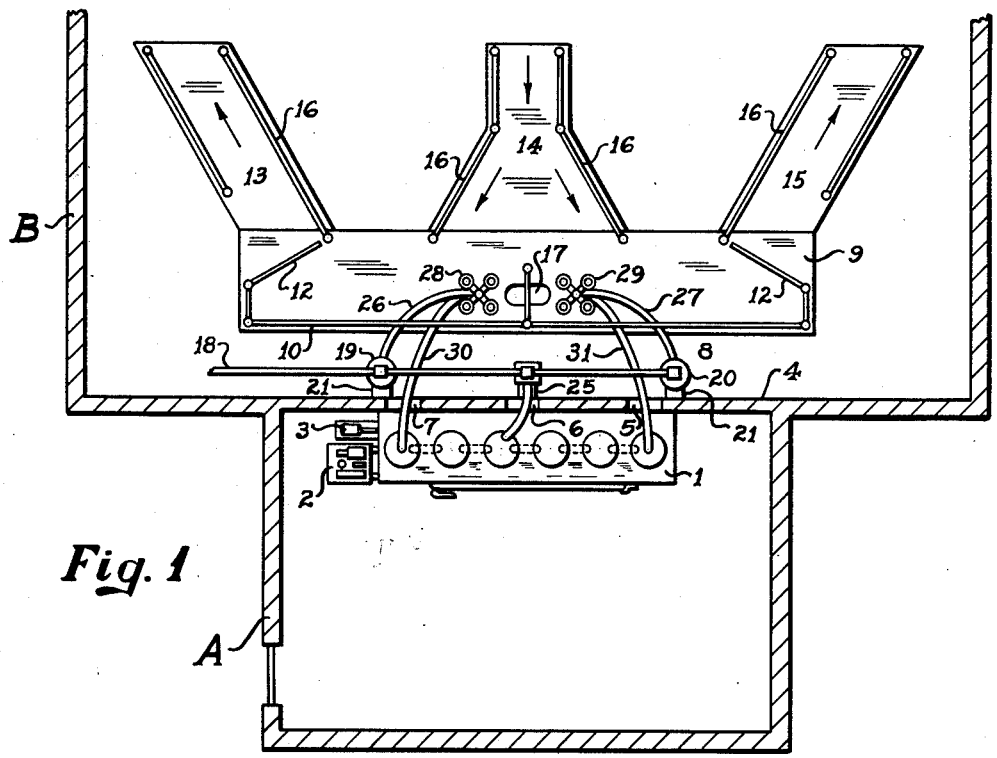
Figure 1 is a plan view partly in section of an enclosure with portions broken away, and the adjoining milk house.

Referring to Figure 1, the letter A designates the milk house, and letter B, the barn, or any other form of animal enclosure, including a fence. Neither the barn nor the milk house is essential to the combination, but it is preferable to include the milk house for the protection of the refrigerating means, and to enclose the milking stall structure shown in this figure, in order to protect the animals while being milked from inclement weather conditions. In dry sections of the country, however, instead of providing a barn, a fence may be substituted for the structure indicated at B.

Figure 2:
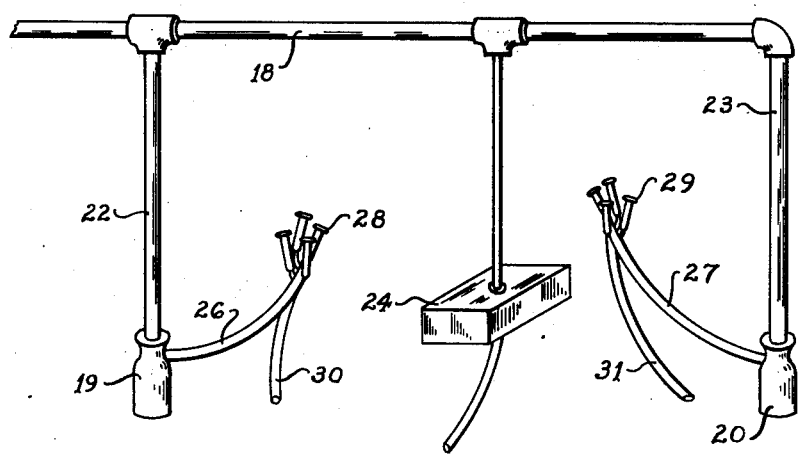
Figure 2 is a modification showing a portion of the vacuum line and showing the location of the traps.

The milk house and barn, or enclosure, as well as the raised platform forming part of the milking stalls and ramps, may be similar to, or the same as that shown in Figure 2 of my Patent No. 2,512,094, granted June 20, 1950.

Any type of refrigerator may be used, the refrigerator being indicated by the numeral 1 having the refrigerating mechanism 2 including temperature regulating means, the refrigerator being driven by a motor 3. There is a partition 4 having openings 5, 6 and 7. This partition may be constructed of solid material, but under some conditions it may be of wire netting, or similar material.

The barn, or enclosure, B is provided with an aisle 8 which is located between the wall 4 and the raised platform 9 forming a part of the stall structure. A suitable railing 10 is provided having pivoted doors 12, and there are ramps 13, 14 and 15 having railings 16 for guiding the farm animals to and from the stalls, which stalls principally consist of the raised platform 9, railing 10 and a sump 17.

Parts heretofore described form no part of the present invention, except as part of the general combination, together with the other elements hereinafter described.

Preferably extending above the aisle 8 is the overhead vacuum line 18 forming part of the milking machine, and at spaced intervals along this vacuum line, so as to be connected thereto, is the combined pulsator and trap constructions 19 and 20 shown in either Figures 3, 4, 5, 6 or 7. These constructions are shown diagrammatically in Figure 1 for location purposes only. They are connected by the pipe constructions hereinafter to be described to the pulsators and traps by supporting means 21, and extension pipes 22 and 23 as seen particularly in Figure 2.

In Figures 1 and 2 is shown a third trap 24 which is supported by means 25 to the wall 4.

Branch vacuum lines 26 and 27 lead to the teat cups 28 and 29, respectively, and the milk lines are indicated at 30 and 31, respectively.

Referring to Figure 3 which shows one form of the trap and pulsator combination, the numeral 32 indicates the pulsator alone and pipe 33 leads from this pulsator to the trap 19a; these members being supported by the support 21 on the wall 4.

The pipe 33 leads into the trap 19a due to the opening 34 in the plug 35 which itself extends into an opening 36 in the trap 19a. Mounted on the lower end of the plug is a sleeve 37. From the trap 24 the vacuum line connects to the container means.

The plug 35 is also provided with a second opening 38 into which extends the vacuum pipe 26. The open ends 40 and 41 of the vacuum pipes 26 and 33 are located in a position comparatively remote from the open end 42 of the sleeve 37, so that these ends are spaced upwardly from the open end of the sleeve.

Referring to Figure 4 in which is shown another form of trap, said trap being indicated by the numeral 20a, the pulsator by itself is indicated by the numeral 39, the vacuum line being shown at 18. Extending downwardly from the pulsator is the pipe 43 that extends into the trap 20 through the opening 44 of the plug 45. This plug extends through an opening 46 in the trap, or jar 20. Leading outwardly from the aperture 47 of said plug is the pipe 27. It will be noted that the open end of this pipe 48 is considerably higher than the open end 49 of the pipe 43.

Referring to Figure 5, it will be noted that the pulsator by itself is indicated by the numeral 50. This is connected to the vacuum line 18, and extending downwardly from the pulsator is the pipe 51 which extends through aperture 52 of plug 53, which latter is located in opening 54 of the trap. The pipe 27 extends through a second aperture 55 in the plug, and this pipe may extend downwardly below the open end 56 of pipe 51, but preferably an extension pipe 57 is provided which closely engages the inner diameter of pipe 27. This pipe 57 is provided with an open end 58 which is located a substantial distance below the open end 56 of the pipe 51.

Referring to Figure 1 again it will be noted that pipe 30 is installed on any suitable milk container means, such as the first of the series of cans, whereas pipe 31 is installed on the last of the series of cans, and these cans may be in a single row as shown or they may be in a double row in the milk cooler or refrigerator. Also, there may be a double row of cans in said cooler as indicated in several of my patents, including Patent No. 2,512,094, granted June 12, 1950. In place of the series of cans, a single milk container means may be used as shown in Figures 6 and 7, as the invention is not concerned with the number of milk containers that are used in the refrigerator, i. e., whether one or more are used.

Referring to Figure 6, the milk container means 60 will be located in the refrigerator 1, shown in Figure 1 either with or without other milk cans. The numeral 61 indicates an open ended sleeve which extends through an aperture 62 in the cover 63. The connection between the cover 63 and the sleeve 61, that is, the connection between these two elements and the milk container means is a hermetically sealed connection. Also, there is a vacuum conduit 64 and milk conduit 65 which extends into the sleeve and is hermetically sealed, so that a minus pressure may be applied to the interior of the milk container means. The vacuum conduit 64 leads through the cover 67 of the container 68. Leading out of this same cover is the conduit 69 which is connected to the vacuum line 70.

It will be understood that all of the connections including the connection between the cover and container means, and the pipe connections through the cover, are hermetically sealed so as to prevent leakage and so that the minus pressure from the vacuum line 70 may be applied to the interior of the container means 60. The numeral 71 indicates a solid partition extending entirely across the interior of the container 68, but terminating short of the base thereof. The numeral 72 indicates one of the elements in the electric circuit, such as the milking machine motor. From this element is led the wires 73 to a transformer 74 which reduces the current in the line from 110 or 120 volts to about 6 volts. This 6 volt current is led by the wires 75 through the cover 67, and is electrically connected to the terminal 76.

During the milking operation the milk passes into the milk container means 60. Should there be any accumulation of moisture in the container or trap 68 due to condensation, or for other reasons, the rise of the fluid (condensed moisture) in trap 68 will eventually reach the point where it will come in contact with the terminal 76. When this occurs the circuit to the milking machine is shorted so as to stop the operation of the machine.

In Figure 7 a somewhat similar construction is diagrammatically shown. In this construction the container means is indicated at 66. The container means is provided with a cover 77, a sleeve 78 and vacuum pipe 79 as well as milk pipe 80.

The motors M shown in Figures 6 and 7 are the usual alternating current electric motors that are energized from a suitable source of A. C. current, as diagrammatically illustrated in these figures.

The milking machine vacuum producing electric motor is indicated at 81. From this motor there are leads 82 to a transformer 83 which reduces the current to about 6 volts that passes through the wires 84. These wires are connected through the cover 77 to the terminal 85. This construction including the electrical connection an terminal is applied to the container means such as the end can of the series of cans, and its purpose is to disconnect the vacuum drive electric motor 81 when the milk in the last can has reached a predetermined level. When this occurs the milk contacts the terminal 85 which short-circuits the said motor 81. Any other suitable means for interrupting the circuit to said motor, or to other motors for driving elements of the milking apparatus, may be employed. The main object in the construction shown in Figure 7 is to provide an electric means for stopping the milking machine, and particularly the vacuum producing motor, in order to shut off the milking machine as the last can of the series of cans located in the refrigerator, such as is shown for instance in Figure 1, becomes filled with milk.

It will be appreciated therefore that the transformers 74 and 83 of Figures 6 and 7 form primary and secondary circuits. The shorting of the ends 71 and 76 of Figure 6 or the ends 85 of Figure 7 controls the operation of its motor by stopping its operation, thus closing down the operation of milking machine vacuum as indicated above.

I claim:

1. In combination, a milking system having a cooling means, milk container means located in said cooling means, a vacuum line, mechanical refrigerating means operatively connected to said cooling means for continuously cooling the milk in said milk container means located in said cooling means, whereby to continuously remove body heat from said milk during the milking operation and to maintain a predetermined temperature of the milk in said milk container means, at least one set of teat cups, pulsator means, trap means, and conduit means connected to said vacuum line, said pulsator means, said trap means, said set of teat cups and said milk container means, said trap means including a receptacle having an opening, an electric circuit, an electric milking machine motor connected to said circuit and a branch electric line forming part of said circuit and extending through the opening and into the interior of said receptacle whereby when the milk in said trap reaches a predetermined level said electric motor will be short circuited and stopped.

2. A milking system having a cooling means, milk container means located in said cooling means, milking means including a vacuum producing electric motor, teat cups and milk and vacuum line means connected to said teat cups and to the interior of said milk container means, the combination with said system of an auxiliary circuit connected to said motor whereby when said auxiliary circuit is completed said motor becomes short circuited and said motor stops, said auxiliary circuit having terminal means extending into the interior of said milk container means, whereby when milk in at least one of said milk container means contacts said terminal means said milk machine motor is short circuited and stopped and the vacuum in said vacuum line means is thereby discontinued.

3. In combination, a milking system having a cooling means, a milk container means located in the cooling means, a vacuum line, a plurality of sets of teat cups, pulsator means, and conduit means connected to said vacuum line, said pulsator means, said sets of teat cups and said milk container means, said milk container means having an opening, an electric circuit, an electric milking machine motor connected to said circuit and a branch electric line forming part of said circuit and extending through the opening in said milk container means and into the interior of said container, whereby when the milk in said container reaches a predetermined level said electric motor will be short circuited and stopped.

4. A milking system having a cooling means, a milk container means located in said cooling means, milking means including a milking machine motor, teat cups and milk and vacuum line means connected to said teat cups and to the interior of said milk container means, the combination with said system of an auxiliary circuit connected to said motor whereby when said auxiliary circuit is completed said motor becomes short circuited and said motor stops, said auxiliary circuit having terminal means extending into the interior of said milk container means, whereby when milk in said milk container means contacts said terminal means, said motor will be short circuited and stopped and the vacuum in said vacuum line means is thereby discontinued.

5. In combination, a milking system comprising a vacuum line, a plurality of sets of teat cups, pulsator means, and conduit means connected to said vacuum line, said pulsator means, said sets of teat cups and said milk can means; said trap means including a receptacle having an opening, an electric circuit, a milking machine motor connected to said circuit and a branch electric line forming part of said circuit and extending through the opening and into the interior of said receptacle, whereby when the fluid in said receptacle reaches a predetermined level said electric motor will be short circuited, and stopped.

6. A milking system having milk container means, milking means including a vacuum producing milking machine electric motor, teat cups and milk and vacuum line means connected to said teat cups and to the interior of said milk container means; the combination with said system of an auxiliary circuit connected to said milking machine motor whereby when said auxiliary circuit is completed said motor becomes short circuited and said motor stops, said auxiliary circuit having terminal means extending into the interior of said milk container means, whereby when milk in said milk container means contacts said terminal means, said milking machine motor is short circuited and stopped and the vacuum in said vacuum line means is discontinued.

References Cited in the file of this patent

UNITED STATES PATENTS

| | | |
|---|---|---|
| 1,428,670 | Williams et al. | Sept. 12, 1922 |
| 1,534,939 | Fuge | Apr. 21, 1925 |
| 1,978,941 | Hapgood | Oct. 30, 1934 |
| 2,006,393 | Hapgood | July 2, 1935 |
| 2,009,400 | Hapgood | July 30, 1935 |
| 2,081,650 | Tamminga et al. | May 25, 1937 |
| 2,380,771 | McDonald | July 31, 1945 |
| 2,498,401 | Duncan | Feb. 21, 1950 |
| 2,509,214 | Cordis | May 30, 1950 |
| 2,512,094 | Duncan | June 20, 1950 |
| 2,603,396 | Redin et al. | July 15, 1952 |
| 2,606,524 | Daily et al. | Aug. 12, 1952 |

FOREIGN PATENTS

| | | |
|---|---|---|
| 595,875 | Great Britain | Dec. 19, 1947 |